United States Patent [19]

Bullat et al.

[11] Patent Number: 4,944,074

[45] Date of Patent: Jul. 31, 1990

[54] PRESET RESTRAINING DEVICE

[75] Inventors: David M. Bullat, Carlsbad; Willie L. Thomas, San Diego, both of Calif.

[73] Assignee: The United States of America as represented by the Secretary of the Navy, Washington, D.C.

[21] Appl. No.: 327,856

[22] Filed: Mar. 15, 1989

[51] Int. Cl.⁵ .............................................. A44B 11/25
[52] U.S. Cl. ......................................... 24/602; 24/629
[58] Field of Search ......................... 24/602, 629, 700; 114/247, 252, 230

[56] References Cited

U.S. PATENT DOCUMENTS

| | | | |
|---|---|---|---|
| 3,413,692 | 12/1968 | Pressley | 24/602 |
| 3,540,089 | 11/1970 | Franklin | 24/602 |
| 4,733,625 | 3/1988 | Allen | 24/602 X |
| 4,742,605 | 5/1988 | Ritacco | 24/602 |

*Primary Examiner*—Laurie K. Cranmer

[57] ABSTRACT

A mechanical release mechanism is designed to separate when a predetermined tension is exerted between two members. A ball or plug member is retained within a slitted, cylindrical-shaped spring housing member. When the tensile force between the members reaches a predesigned release force, the spring housing member is spread apart to allow the ball or plug to be pulled free. Merely reconfiguring the cylindrical spring housing member from different materials or with different dimensions or number of slits alters the tensile release force to accommodate a variety of different applications. After a predetermined separation, the members can be reassembled for reuse.

3 Claims, 1 Drawing Sheet

PRESET RESTRAINING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Release mechanisms are many and varied in design and, when certain predetermined events occur, most mechanisms separate to free one interconnected unit from another. Typically, the units are separated when a predetermined load or force is exceeded and a break wire, shear pin, tear strip or an equivalent "weak link" is parted. Unfortunately, since physical dimensions, batch compositions, and mechanical tolerances are not consistent, many conventional "weak link" designs did not provide the degree of reliability needed for specialized applications. In addition, the methods were often not repeatable and were sensitive to storage and handling. Despite the fact that some of the "weak link" devices appeared to offer low cost, their failure to function reliably often resulted in an untimely damage of the attached units when they did not part as expected.

Thus, a continuing need exists in the state of the art for a reliable, reusable mechanical release mechanism which separates at a predesigned release tension.

SUMMARY OF THE INVENTION

The present invention is directed to providing a reusable mechanical release mechanism for separating at a predetermined tensile force. A ball-plug member is configured to fit within the bore of a slitted cylindrical spring housing member. When the force on the ball-plug member reaches a designed tensile release force, the slitted cylindrical spring housing member is bent and spread apart freeing the ball-plug member. Changing the number of slits, the dimensions and/or the materials selected may change the release force to accommodate a different or more specialized use for the mechanism.

An object of the invention is to provide a mechanical release mechanism designed to separate at a predetermined tensile force.

Another object of the invention is to provide a release mechanism that is reusable after an initial separation.

Yet another object is to provide a mechanical release mechanism that can be configured to alter the tensile force required to effect its separation.

Another object is to provide a mechanical release mechanism capable of being fabricated from numerous different materials with a variety of dimensions so that different tensile release forces can be accommodated.

Still another object is to provide a mechanical release mechanism having a flotation or cushioning member attached thereto to protect or enable its recovery for reuse.

These and other objects of the invention will become more readily apparent from the ensuing specification and claims when taken in conjunction with the appended drawings.

DESCRIPTION OF THE PREFERRED EMBODIMENT

Figure 1:
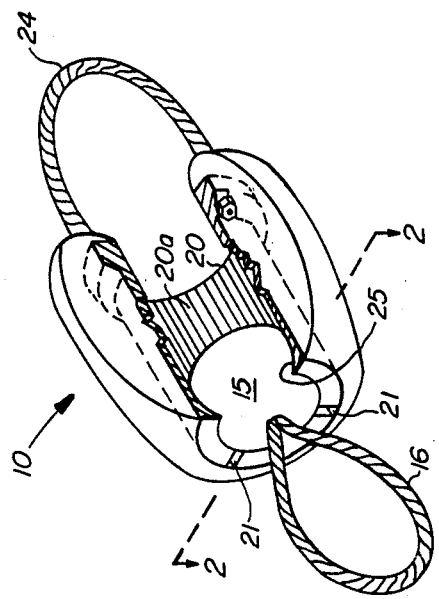
FIG. 1 is an isometric view of a ball release mechanism partially in cross section.

Referring now to FIG. 1 of the drawings a ball release mechanism 10 has been designed to assure a reliable release when a predetermined tensile force is reached and exceeded. Inherent in this mechanism is a broad design latitude so that the tensile release force can be determined over a considerable range. As a consequence, modifications of the release mechanism are envisioned to give a designer an adaptable separation device to meet a wide range of needs.

The mechanism has a ball 15 member which is connected to a cable or line 16. The cable or line is welded, bonded or otherwise suitably affixed, as the case may be, to the ball. Preferably it may be fitted through a diametric bore in the ball and secured in place by techniques well established in the art. The ball is fashioned from a wide variety of materials such as stainless steel, brass, plastics, etc. that fulfill a number of design requirements like corrosion resistance, sufficient strength, frictional properties, for example.

The other main constituent of the mechanism is a slitted, cylindrically-shaped spring housing member 20 which is provided with a longitudinal bore 20a to allow ball member 15 to slidably travel, at least partially along its length. It, like the ball member, may be fashioned from a multitude of different materials which possess the required properties for a given use.

At least one slit 21 is cut to longitudinally extend in spring housing member 20. Usually, in practice however, a plurality of slits are provided in the spring housing member and separate the housing member into a plurality of adjacent legs 22 that lie in a cylindrical shell-shaped projection. The number of slits and the selectability of different materials gives a user great design latitude, as will be elaborated on below.

Figure 2:
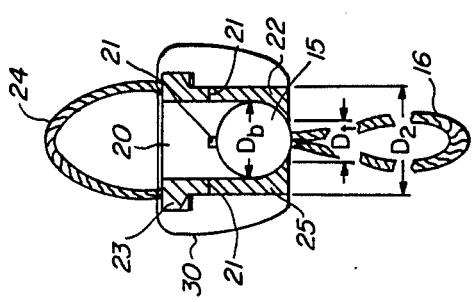
FIG. 2 shows a cross-sectional view taken generally along lines 2—2 in FIG. 1.
Figure 3:
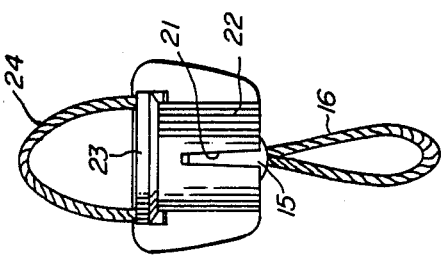
FIG. 3 is a side view, partially in cross section depicting details of the slitted cylindrical spring housing member.

Looking to FIGS. 2 and 3, slitted cylindrically-shaped spring housing member 20 includes a circumferential lip 23 provided with a pair of diametrically opposed holes, not shown, for receiving the opposite ends of a U-shaped wire or line 24. The wire or line is fed through the diametrically opposed holes and is secured therein by brazing, knots or other suitable manners of affixing the wire or line to lip 23. As will be apparent to those skilled in the art to which this invention pertains, threads, spurs or other mechanical coupling structures could be substituted for lip 23, holes and wire 24, as well as, loop 16 for attaching mechanism 10 to units that need to be selectably released.

The opposite end of the slitted cylindrically-shaped spring housing member is provided with a rim 25, inwardly extending into bore 20a and shaped to accommodate the outer, rounded dimensions of ball member 15. It is here to be noted that the rim is essentially a broken-rim structure with individual segments thereof being parts of the adjacent legs 22 that were formed by slits 21. The ball is sized to freely travel the length of bore 20a of slitted cylindrically shaped spring housing member 20 but is prevented from further axial travel and is retained by inwardly extending rim 25.

Optionally, an impact protecting foam jacket 30 is provided about the spring housing and while affording a degree of protection may also be used for buoyancy purposes if the proper flotation material is selected.

The dimensions of the ball and the bore of the spring housing permit the ball to be dropped into the slitted cylindrically shaped spring housing from the end where U-shaped cable 24 is located and permits the orientation of the mechanism so that loop 16 extends in the axially opposite direction from cable 24. All that remains to be done to assure a predetermined separation is to merely couple the cables to the appropriate units.

When a sufficient tensile force is exerted between the cables, the ball member is pulled through the housing member until the ball abuts the rim. Continued pulling causes the ball to cam and bend the legs outwardly until the tensile load is sufficient to pull the ball past the rim. At this moment, the release mechanism separates.

The shape of slitted cylindrically shaped spring housing member 20 is such that it may be machined out of any number of materials ranging from stainless steel to plastics with a change of the force which retains the ball. More malleable or resilient materials might lower the tensile force required to pull ball member 15 from slitted cylindrically-shaped spring housing member 20. Corrosion resistance might require that stainless steel or space age plastics be selected or other materials might be dictated by some environmental peculiarities which must be accommodated.

The retention force could be further modified by making the walls of the slitted cylindrically shaped spring housing member thicker or thinner to thereby increase or decrease the retaining force needed to be overcome.

Optionally, any practical number and differentially shaped slots could be selected and appropriately machined with a consequent change in the inward spring biasing or holding force exerted by legs 22. More slits could be shaped in the spring housing to lessen the force that needs to be overcome by ball 15 when a tensile load is born between the cables.

Sufficient design latitude is inherent in this inventive concept to construct a release mechanism with a desired and predetermined release force in accordance with the reference characters shown on FIG. 2 and the following relationships:

$$I = R^3 t \left( \alpha + \sin \alpha^o \cos \alpha^o - \frac{2 \sin^2 \alpha^o}{\alpha} \right)$$

$$P = \frac{3EI\Delta x}{L_1^3}$$

$$\Delta x = \frac{D_b - D_t}{2}$$

where:
E = modulus of Elasticity of the cylindrical housing
I = moment of Inertia
$\Delta x$ = maximum deflection
$L_1$ = length of slit
$\alpha = \frac{1}{2}$ angle in radians between slits
$\alpha^o = \frac{1}{2}$ angle the radial angle between slits expressed in degrees
P = load on each leg ( total load at release divided by number of legs )
$R_2 = D_{2/2}$
t = thickness of cylindrical housing wall
$D_b$ = diameter of ball
$D_t$ = minimum cylindrical housing diameter
$D_2$ = outside a cylindrical housing diameter As can be seen from the foregoing, this inventive concept provides a sufficient enabling teaching to create and produce a suitable mechanical release mechanism that will reliably release at a predetermined tensile load and which is recyclable when the same or a similarly configured rounded or ball-shaped member is placed within the spring housing member. The relationships expressed above are included to demonstrate the capabilities of design and are not to be construed as limiting the scope of this concept.

Figure 4:
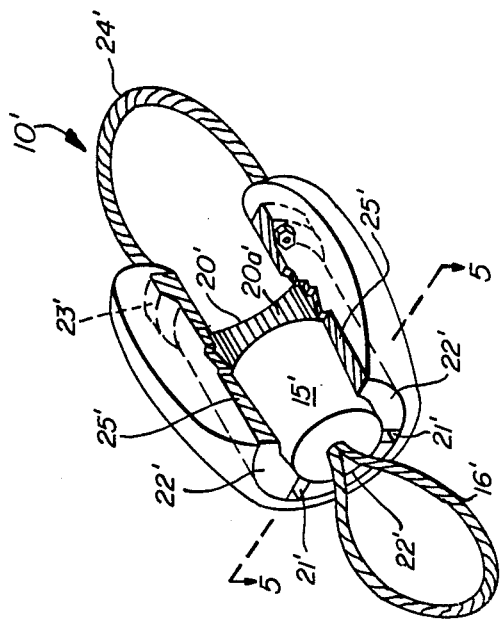
FIG. 4 is an isometric view of a plug release mechanism shown partially in cross section.
Figure 5:
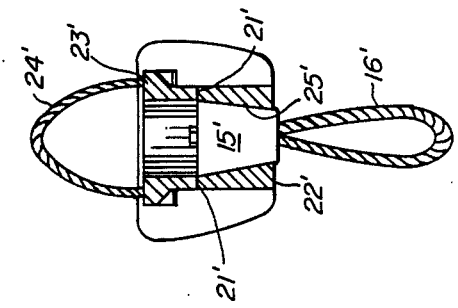
FIG. 5 is a cross-sectional view taken generally along lines 5—5 in FIG. 4.
Figure 6:
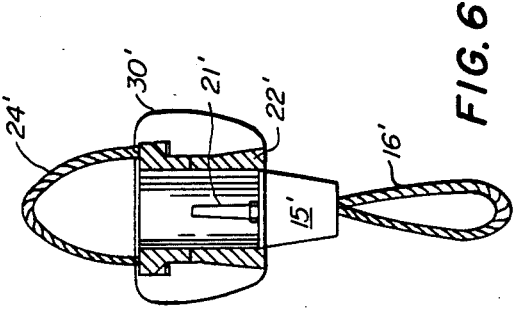
FIG. 6 is a cross-sectional view taken generally along lines 5—5 in FIG. 4 with the plug just about to be removed from the slitted cylindrical spring housing member.

A modified mechanical release mechanism 10' is shown in FIGS. 4, 5, and 6. This design has a slitted cylindrically-shaped spring housing member 20' provided with a longitudinal bore 20a' that partially extends the length thereof. A radially extending circumferential lip 23' is formed on the housing member and is suitably connected to a U-shaped cable 24'.

A number of slits 21' is cut in the housing member to create a like number of adjacent legs 22' which lie in the same projection as that occupied by the cylindrical shell-shaped housing member. The adjacent legs are configured to define a slitted and tapered, inwardly extending surface or rim 25' which is suitably configured to accommodate the outer dimensions of a frustrum-shaped plug 15'.

Plug 15' is appropriately secured to a wire or line loop 16' for bearing a tensile load. Noting FIG. 5, the plug is dimensioned to enter and longitudinally travel the length of bore 20a' in housing member 20' and rest on the tapered surfaces on adjacent legs 25' of the inwardly extending rim 25'.

When a sufficient tensile load is exerted between U-shaped wire 24' to loop 16', the plug outwardly cams tapered sections 25' until legs 22' are bent outwardly to assume the shape shown in FIG. 6. At this point, or shortly after this position is exceeded, plug 15' pops free and the legs return to their position substantially as shown in FIG. 5. The relationships set out above also may apply when factors such as configuration of the legs, shape of slits, etc. are taken into consideration.

An impact protecting foam jacket 30' also is optionally included in this embodiment and serves to protect as well as grant a degree of flotation if desired. Like the first described embodiment, the flotation jacket is selected from a material which is resilient enough to accommodate the radial outward excursions of the legs of the spring housing member without being permanently deformed and does not appreciably add to the amount of tensile force that needs to be exerted to achieve the release of either the ball or the plug depending on which configuration is selected.

The design disclosed can be selected and manufactured from available, proven materials which assure a proper tensile release force and which do not adversely react with the environment to adversely change the force needed to separate the mechanical release mechanism. The tensile force exerted between the wires also can be arrived at by cut and try methods or other means well known to those skilled in this particular art in addition to the determination procedure indicated by the aforestated relationships.

The versatility of this design and the possibility of selecting different materials with different dimensions makes this mechanical release mechanism adaptable to air, land and sea applications where a predetermined tension is expected to occur at the separation of one unit from another. The use of caustic chemicals toxic fumes and the like does not preclude the design and use of this release mechanism since proper materials can be selected and suitably shaped to meet a particular need. As a consequence of this straightforward concept, the mechanical release mechanism provides consistent results through extreme environmental conditions, such as temperature extremes, and is rugged enough to function reliably in harsh environments such as the ocean or at high altitudes.

Obviously, many other modifications and variations of the present invention are possible in light of the above teachings. It is therefore to be understood that within the scope of the inventive concept the invention may be practiced otherwise than as specifically described.

We claim:

1. An apparatus for releasing a member thereof when subjected to a predetermined tensile force comprising:
 a round-shaped member and
 a retaining member fabricated from a flexible material and having a cylindrical shell-shaped housing provided with an axial bore sized to slidable receive said round-shaped member therein, a lip radially extending inwardly in said axial bore at one end of said cylindrical shell-shaped housing being sized to retain said round-shaped member therein and at least one slit extending part of the length of said cylindrical shell-shaped housing, said at least one slit permitting flexure of a portion of said cylindrical shell-shaped housing to bend and remove said lip out of said axial bore to thereby release said round-shaped member when said predetermined tensile force is exerted between said round-shaped member and said retaining member, said round-shaped member is a rigid ball having an interconnected loop and said cylindrical shell-shaped housing of said retaining member is further provided with a U-shaped member and is provided with a plurality of slits each parallel with one another and each partially extending the length of said cylindrical shell-shaped housing, in which the materials, numbers of slits and dimensions of said cylindrical shell-shaped housing are chosen to assure the proper selective said predetermined tensile force in accordance with the relationships:

$$I = R_2 t(\alpha + \sin \alpha^\circ \cos \alpha^\circ) = 2\sin^2\alpha^\circ$$

$$P = 3EI\Delta x/L_1^3$$

$$\Delta_x = (D_b - D_t)/2$$

where:

E = modulus of Elasticity of the cylindrical housing, I = moment of Inertia, $\Delta_x$ = maximum deflection, $L_1$ = length of slit, $\alpha = \frac{1}{2}$ angle in radians between slits, $\alpha^\circ = \frac{1}{2}$ angle the radial angle between slits expressed in degrees, P = load on each leg (total load at release divided by number of legs), $R_2 = D_2/2$, t = thickness of cylindrical housing wall, $D_b$ = diameter of ball, $D_t$ = minimum cylindrical housing diameter and $D_2$ = outside cylindrical housing diameter.

2. An apparatus for releasing a member thereof when subjected to a predetermined tensile force comprising:
 a plug-shaped member having a frustro-conical configuration;
 a retaining member fabricated from a flexible material and having a cylindrical shell-shaped housing provided with an axial bore sized to slidable receive said plug-shaped member therein, a tapered rim configured to conform to the frustro-conical configuration of said plug-shaped member and extending into said axial bore to retain said plug-shaped member in said cylindrical shell-shaped housing and at least one slit extending part of the length of said cylindrical shell-shaped housing to permit flexure of a portion of said cylindrical shell-shaped housing to bend and remove said tapered rim out of said axial bore to release said plug-shaped member when said predetermined tensile force is exerted between said plug-shaped member and said retaining member, said plug-shaped member is provided with an interconnected loop and said cylindrical shell-shaped housing is further provided with a U-shaped member and is provided with a plurality of slits which may be parallel with one another and each is partially extending the length of said cylindrical shell-shaped housing and in which the materials, numbers or slits and dimensions of said cylindrical shell-shaped housing are chosen to assure the proper selective said predetermined tensile force in accordance with the relationships:

$$I = R_2 t(\alpha + \sin \alpha^\circ \cos \alpha^\circ) = 2\sin^2\alpha^\circ$$

$$P = 3EI\Delta x/L_1^3$$

$$\Delta_x = (D_b - D_t)/2$$

where:

E = modulus of Elasticity of the cylindrical housing, I = moment of Inertia, $\Delta_x$ = maximum deflection, $L_1$ = length of slit, $\alpha = \frac{1}{2}$ angle in radians between slits, $\alpha^\circ = \frac{1}{2}$ angle the radial angle between slits expressed in degrees, P = load on each leg (total load at release divided by number of legs), $R_2 = D_2/2$, t = thickness of cylindrical housing wall, $D_b$ = diameter of ball, $D_t$ = minimum cylindrical housing diameter, and $D_2$ = outside cylindrical housing diameter.

3. An apparatus according to claims 1 or 2 further including:
 an impact protecting jacket optionally having a flotation capability and being carried on said retaining member.

* * * * *